(12) United States Patent
Chen

(10) Patent No.: US 11,435,562 B2
(45) Date of Patent: Sep. 6, 2022

(54) PROJECTION DEVICE AND PROJECTION SYSTEM INCLUDING THE SAME

(71) Applicant: TRIPLE WIN TECHNOLOGY(SHENZHEN) CO.LTD., Shenzhen (CN)

(72) Inventor: Jin-Ke Chen, Jincheng (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 359 days.

(21) Appl. No.: 16/689,293

(22) Filed: Nov. 20, 2019

(65) Prior Publication Data

US 2021/0109329 A1   Apr. 15, 2021

(30) Foreign Application Priority Data

Oct. 10, 2019  (CN) .......................... 201921690364.1

(51) Int. Cl.
   *G02B 13/16*   (2006.01)
   *G03B 21/20*   (2006.01)
   *G03B 21/14*   (2006.01)

(52) U.S. Cl.
   CPC ......... *G02B 13/16* (2013.01); *G03B 21/2006* (2013.01); *G03B 21/142* (2013.01)

(58) Field of Classification Search
   CPC .... G03B 21/16; G03B 21/142; G03B 21/145; G03B 21/208; G03B 21/2013; G03B 21/2033; G03B 21/2053; G02B 19/00; G02B 19/0052; G02B 19/0061; G02B 13/16; H04N 9/3141; H04N 9/3152; H04N 9/3155; H04N 9/3161; H04N 9/3164

See application file for complete search history.

(56) References Cited

U.S. PATENT DOCUMENTS

| | | | | |
|---|---|---|---|---|
| 8,079,718 B1* | 12/2011 | Zhai | ...................... | H04N 9/3161 353/94 |
| 8,313,197 B2* | 11/2012 | Lee | ........................ | G01B 11/25 353/62 |
| 8,517,539 B2* | 8/2013 | Wakabayashi | ....... | H04N 9/3185 353/50 |
| 8,894,216 B2* | 11/2014 | Reichow | ................... | G03H 1/22 353/46 |
| 10,190,736 B1* | 1/2019 | Pyshos | .................... | F21S 8/026 |

* cited by examiner

*Primary Examiner* — Sultan Chowdhury
(74) *Attorney, Agent, or Firm* — ScienBiziP, P.C.

(57) ABSTRACT

A device for projecting a test pattern for evaluating the image-capturing properties of a lens module includes a light emitting assembly. The light emitting assembly includes a light emitter and a patterning plate on the light emitter. The patterning plate includes a first surface facing the light emitter and a second surface opposite to the first surface. The second surface is concave and defines a patterning groove. The light from the light emitter passes through the patterning groove to form an original pattern for testing, the display of a test pattern being instantly selectable and displayable.

15 Claims, 9 Drawing Sheets

PROJECTION DEVICE AND PROJECTION SYSTEM INCLUDING THE SAME

FIELD

The subject matter herein generally relates to image projection.

BACKGROUND

After lens module of a camera is assembled, the camera takes images of various test patterns, to test and evaluate the quality of the lens module according to the images being captured. The test patterns are usually on paper but different lens modules need to be tested with different test patterns which are obtained by manual modification.

BRIEF DESCRIPTION OF THE DRAWINGS

Implementations of the present technology will now be described, by way of embodiment, with reference to the attached figures.

DETAILED DESCRIPTION

Figure 1:
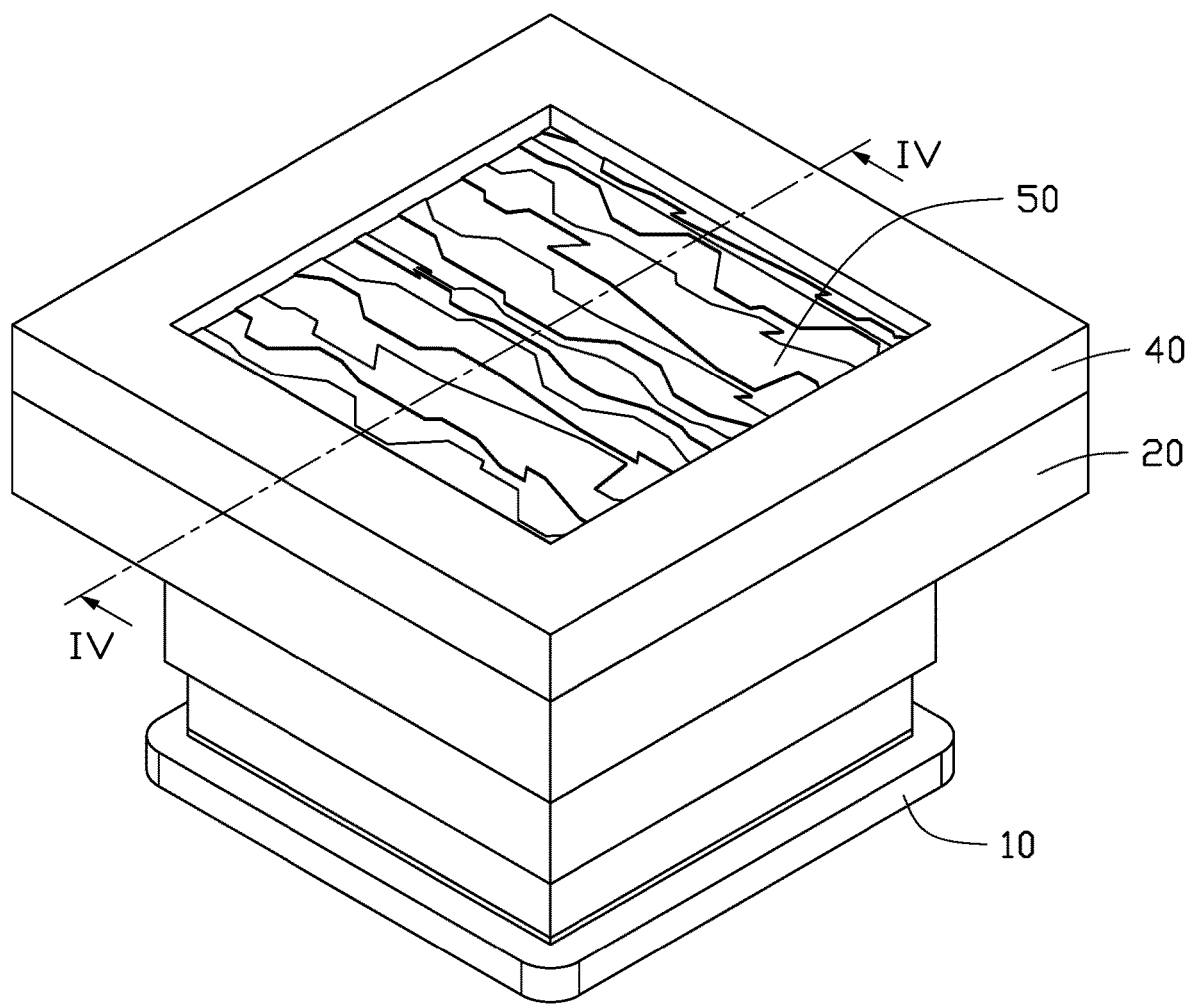
FIG. 1 is an isometric view of an embodiment of a projection device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
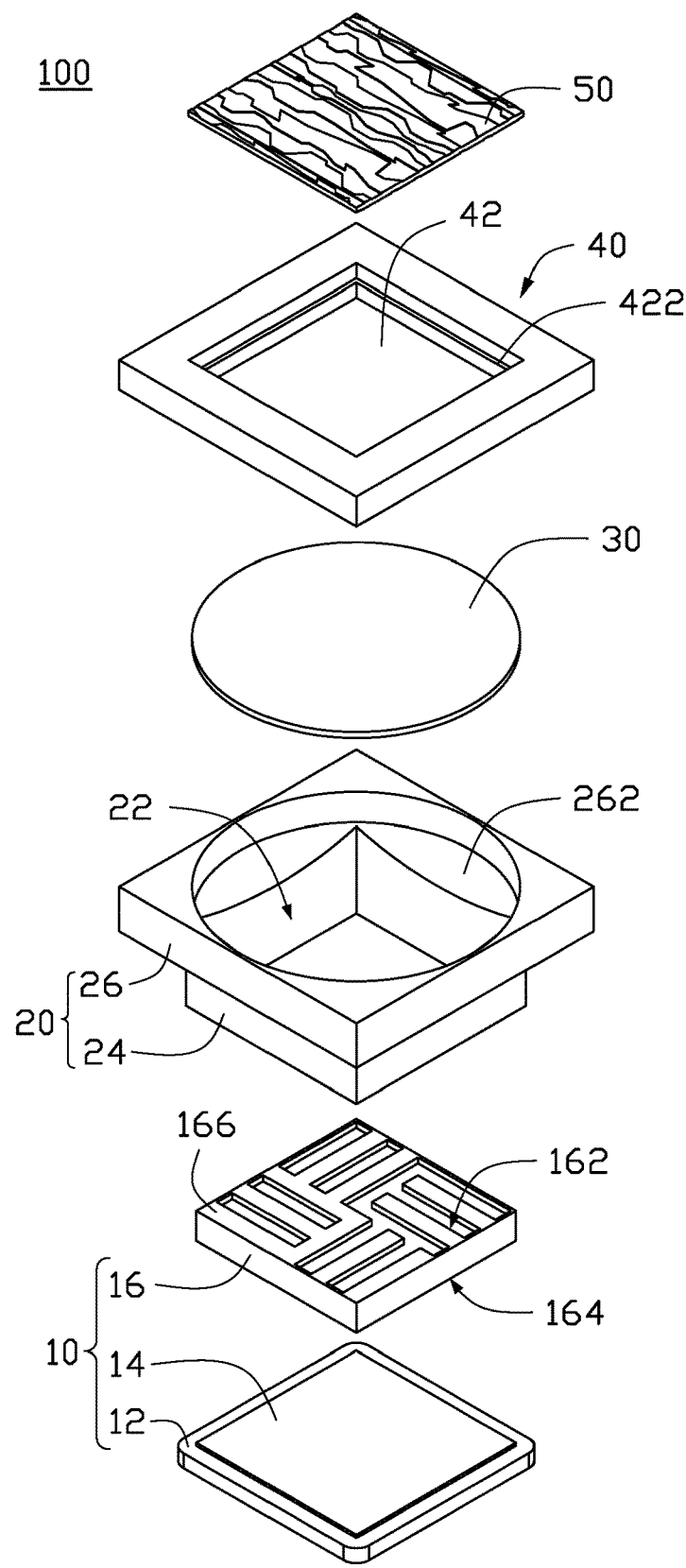
FIG. 2 is an exploded, isometric view of the projection device of FIG. 1.

FIGS. 1-2 illustrate an embodiment of a projection device 100. The projection device 100 includes a light emitting assembly 10, a collimating element 30, and a diffractive optical element 50.

Figure 8:
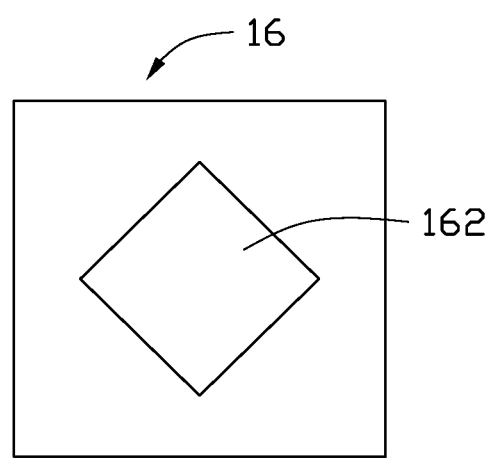

The collimating element 30 and the diffractive optical element 50 are arranged in an optical path of the light emitting assembly 10. The light emitting assembly 10 emits light having an original pattern toward the diffractive optical element 50. The collimating element 30 collimates the light from the light emitting assembly 10. The light emitted by the light emitting assembly 10 passes through the collimating element 30 and into the diffractive optical element 50. The diffractive optical element 50 diffracts the collimated light to generate and project an actual pattern onto an image screen 210 (shown in FIG. 8). The actual pattern displayed can correspond to the original pattern.

Figure 3:
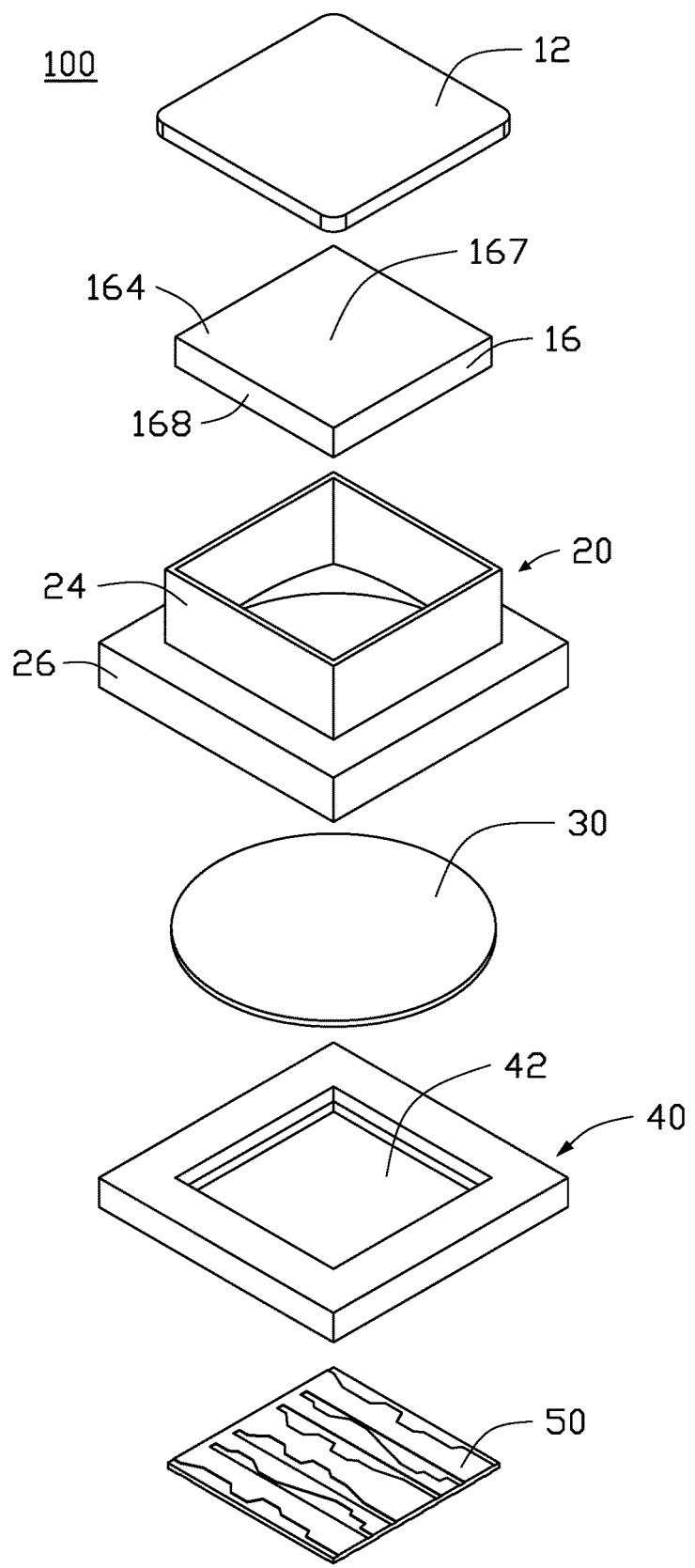
FIG. 3 is similar to FIG. 2, but viewed from another angle.
Figure 4:
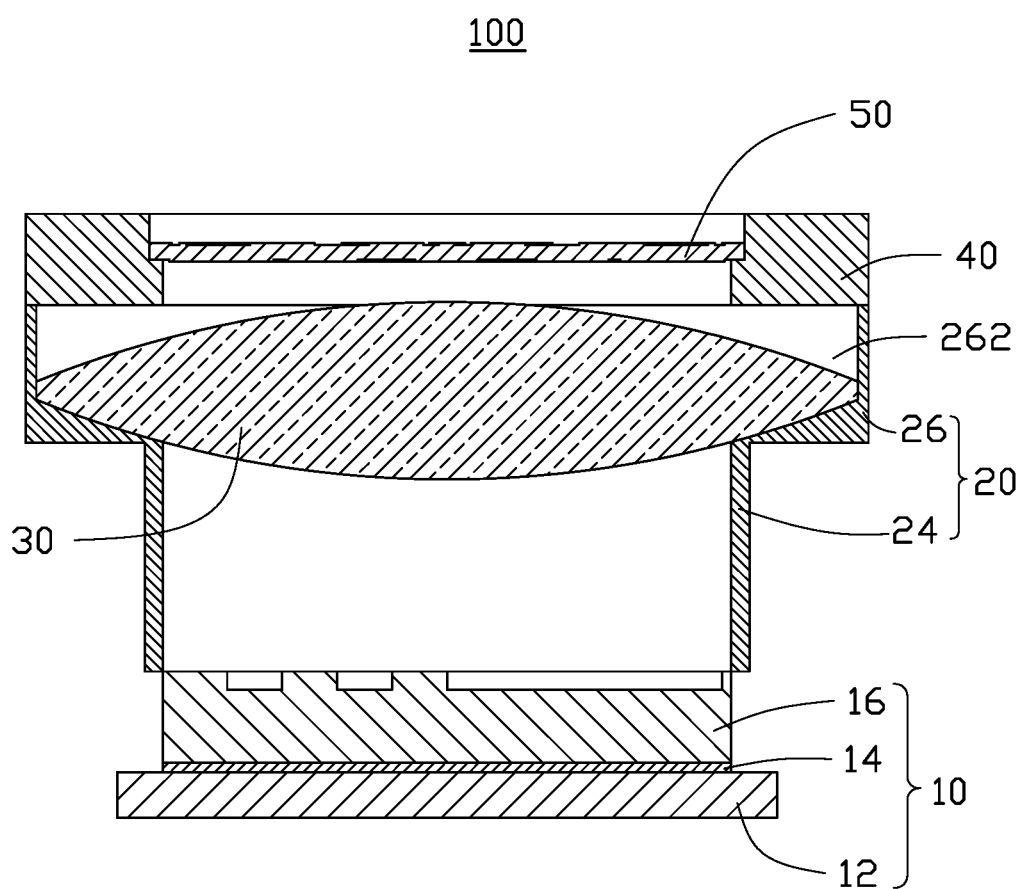
FIG. 4 is a cross-section view along line IV-IV of FIG. 1.

FIGS. 2-4 illustrate that the light emitting assembly 10 includes a base plate 12, a light emitter 14, and a patterning plate 16. Material of the base plate 12 is non-transparent. In one embodiment, the base plate 12 is substantially rectangular. The light emitter 14 is arranged on a surface of the base plate 12. The patterning plate 16 is arranged on the light emitter 14.

The light emitter 14 can be a chip containing a laser diode or a light-emitting diode (LED), that is, the light emitter 14 can be a laser device or a LED light source. The light emitter 14 is configured to emit monochromatic light. In one embodiment, the light emitter 14 is a surface light source.

The patterning plate 16 includes a first surface 164 facing the light emitter 14 and a second surface 166 opposite to the first surface 164. The second surface 166 is concave and defines a patterning groove 162. The patterning plate 16 defines a first area 167 corresponding to the patterning groove 162 and a second area 168 beyond the first area 167. The first area 167 passes the light which is input to the patterning groove 162. The second area 168 is configured to block the input light. The first area 167 is transparent, and the second area 168 is non-transparent. In one embodiment, the first area 167 includes the second surface 166, a first part of the first surface 164 corresponding to the patterning groove 162, and a first part of the patterning plate 16 between the second surface 166 and the first part of the first surface 164. In one embodiment, the second area 168 includes a second part of the first surface 164 beyond the patterning groove 162, a second part of the patterning plate 16 between the second surface 166 and the second part of the first surface 164, and side surfaces connecting the first surface 164 and the second surface 166. The light emitted by the light emitter 14 strikes the first surface 164, passes through the first area 167, exits from the first part of the second surface 166, and passes through the patterning groove 162 to the collimating element 30.

Figure 5:
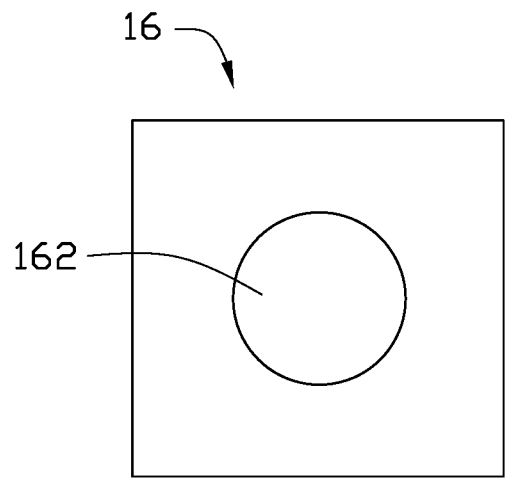
FIG. 5 is a schematic view of an embodiment of an original pattern formed through a patterning plate of the projection device of FIG. 1.
Figure 6:
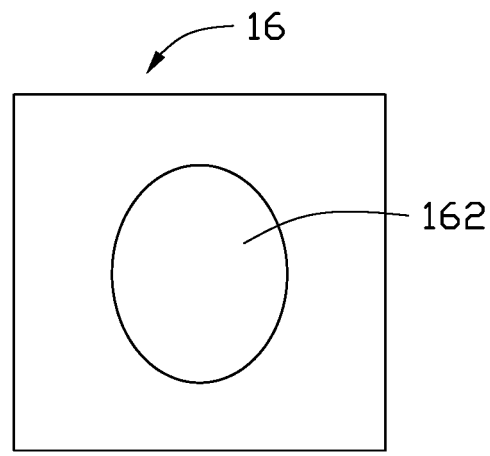
FIG. 6 to FIG. 16 show embodiments of various original patterns formed through patterning plates.
Figure 7:
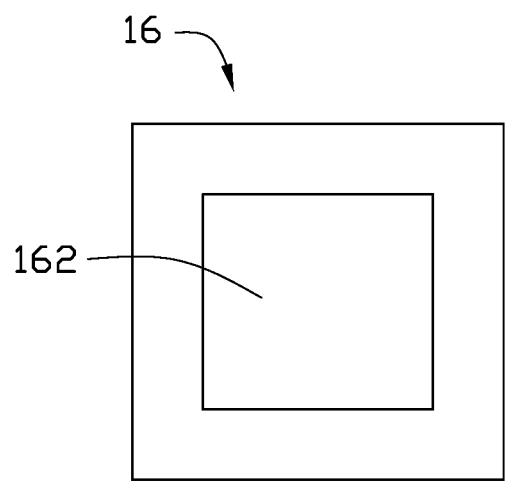
Figure 9:
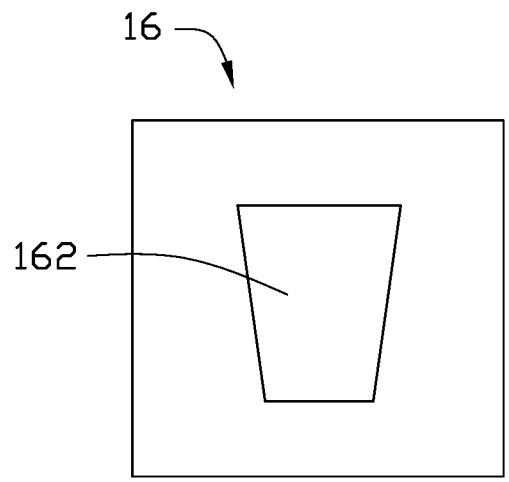
Figure 10:
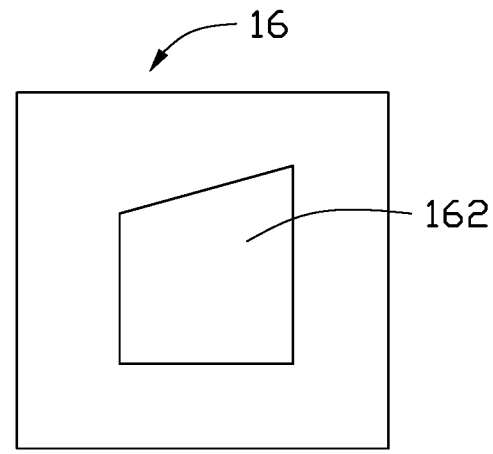
Figure 11:
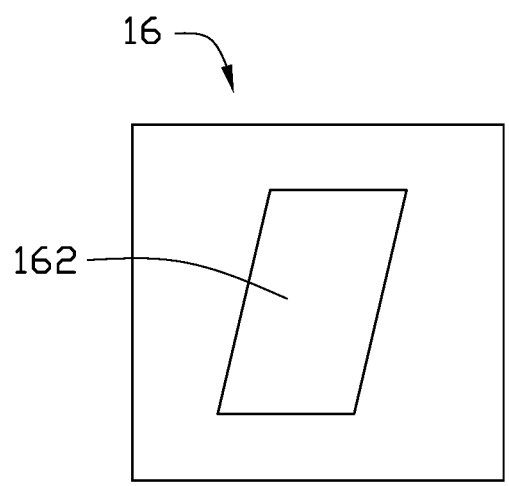
Figure 12:
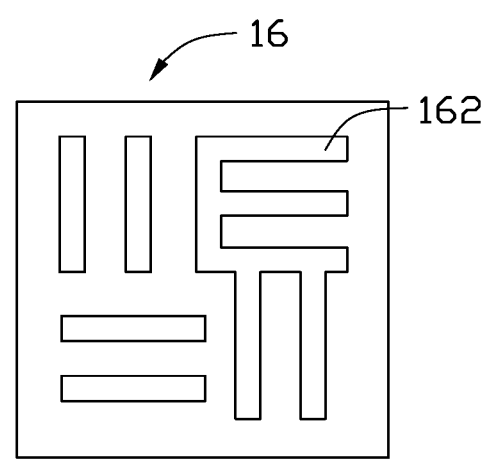
Figure 13:
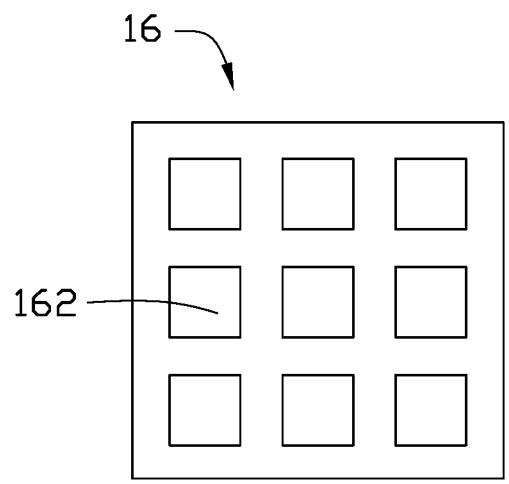
Figure 14:
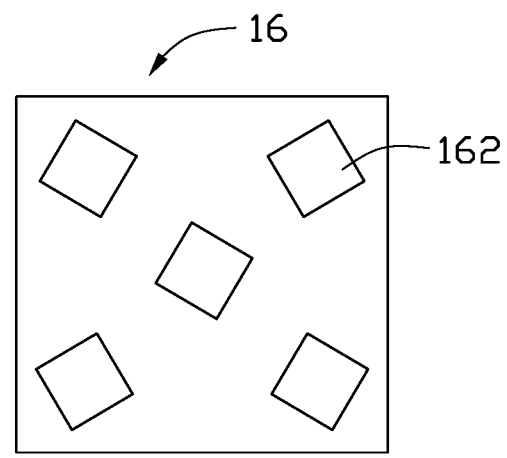
Figure 15:
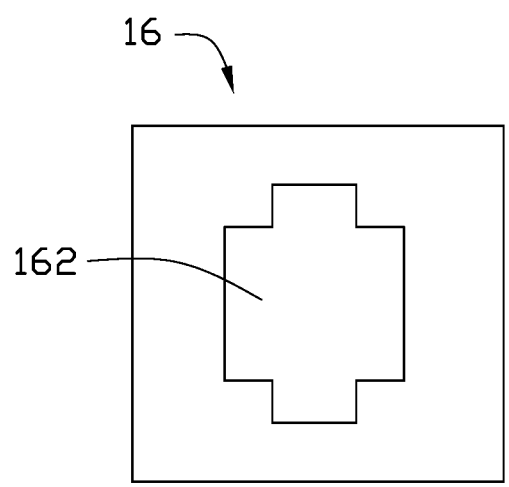
Figure 16:
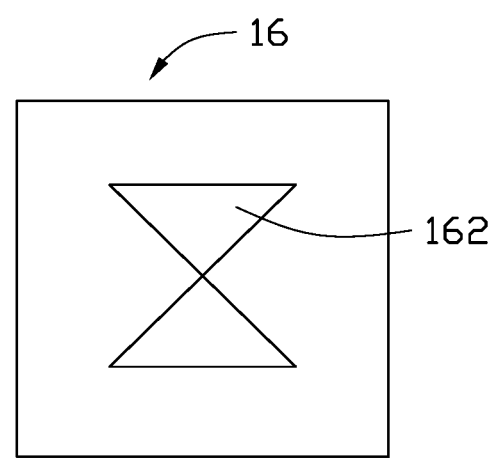

The light from the light emitter 14 passes through the patterning groove 162 to generate an original pattern. The patterning groove 162 can have various shapes including regular and irregular shapes, such as a circle (shown in FIG. 5), an oval (shown in FIG. 6), a rectangle, a square (shown in FIG. 7), a diamond (shown in FIG. 8), a trapezoid (shown in FIGS. 9 and 10), a parallelogram (shown in FIG. 11), and a strip (shown in FIG. 12), etc. The original pattern has a single shape, a combination of single shapes, or a combination of different shapes. The combination mode includes spaced combinations (shown in FIGS. 13 and 14), that is the plurality of pattern being spaced from each other, adjacent combinations (shown in FIGS. 5 and 6), that is the plurality of patterns being adjacent to each other, etc.

The patterning plate 16 can be fixed on the light emitter 14, or be detachably mounted on the light emitter 14. When the patterning plate 16 is detachably mounted on the light emitter 14, the patterning plate 16 can be exchanged according to different texting needs to generate different original patterns.

The projection device 100 further includes a support element 20 for supporting the collimating element 30. The support element 20 is hollow. The support element 20 defines a first through hole 22. The support element 20 is arranged on a surface of the patterning plate 16 away from the base plate 12. The patterning groove 162 is exposed from the first through hole 22, thus the light passing through the patterning groove can pass completely through the first through hole 22.

The support element 20 includes a first support portion 24 and a second support portion 26 coupled to the first support portion 24. The first through hole 22 passes through the first support portion 24 and the second support portion 26. The first support portion 24 is coupled to the patterning plate 16. A width of the first support portion 24 is less than a width of the second support portion 26, thus a first step 262 is formed between the first support portion 24 and the second support portion 26. The first step 262 supports the collimating element 30.

In an alternative embodiment, an area of a surface of the first support portion 24, adjacent to the base plate 12, and adjacent to the first through hole 22 is concave and defines a groove (not shown). The groove is configured to receive the patterning plate 16.

The collimating element 30 is substantially circular. The collimating element 30 arranges the light passing through the first through hole 22 into parallel or layered light for the diffractive optical element 50 to modulate the parallel light.

The projection device 100 further includes a bracket 40. The bracket 40 is mounted on a surface of the second support portion 26 away from the first support portion 24, and is configured to support the diffractive optical element 50. The bracket 40 is substantially hollow and rectangular. The bracket 40 defines a second through hole 42. An area of the of a surface of the bracket 40, away from the second support portion 26 and adjacent to the second through hole 42, is concave and defines a second step 422. The second step is configured to support the diffractive optical element 50.

Figure 17:
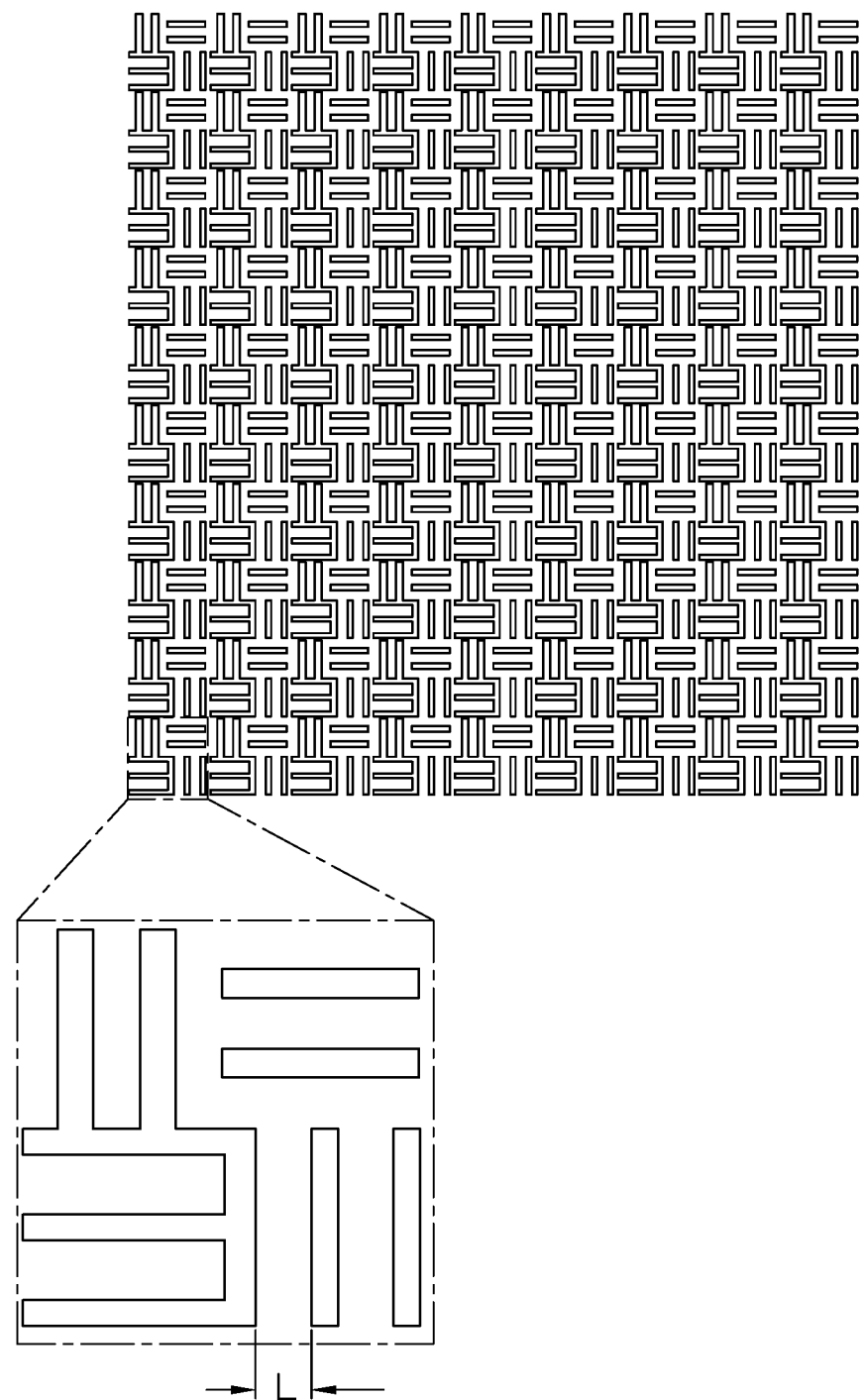
FIG. 17 is a schematic view of an embodiment of an actual pattern formed from an original pattern projected through a diffractive optical element.

The diffractive optical element 50 can rotate and rearrange the parallel light of the original pattern from the collimating element 30, and diffract/transmit the rotated and rearranged light according to needs, to generate a controllable pattern array. Referring to FIG. 17, the pattern array which the diffractive optical element 50 generates after processing the parallel light is projected onto the image screen 210 to form an actual and visible pattern for testing.

Figure 18:
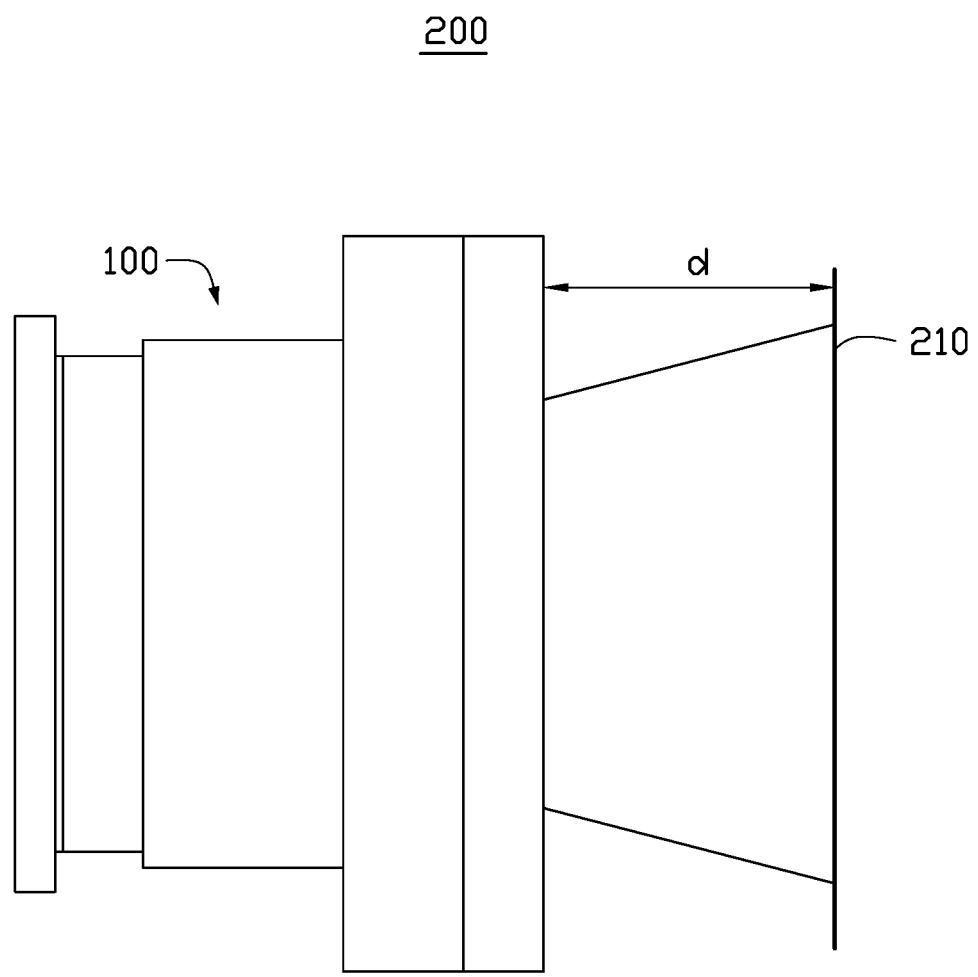
FIG. 18 is a schematic view of an embodiment of a projection system.

FIG. 18 illustrates an embodiment of a projection system 200. The projection system 200 includes the projection device 100 and the image screen 210 spaced from the projection device 100. When in use, the image screen 210 is on the optical path of the projection device 100. A distance "d" between the image screen 210 and the projection device 100 can be adjusted according to needs.

The image screen 210 can be flat panel, that is at least one surface of the image screen 210 is flat. When in use, the flat surface of the image screen 210 faces the projection device 100. In one embodiment, the image screen 210 is an object with a coating, the object is made of non-transparent material with high reflectivity, and the coating reduces visual scatter of the image screen 210. When the projection system 200 is in use, a user can use the actual pattern on the same side as the projection device 100 on the image screen 210.

In an alternative embodiment, the image screen 210 can be a wall with a flat surface.

In an alternative embodiment, the image screen 210 is made of transparent material. The actual pattern can pass through the image screen 210. When the projection system is in use, a user can utilize the actual pattern on the far side of the screen 210 for testing.

The pattern array generated by the projection device 100 is projected on the image screen to form the actual pattern, which can meet the requirements of high-precision. The accuracy of the test result is improved, and the customer satisfaction is improved. The patterning plate 16 for generating the original pattern can be recycled, thus a cost is saved. By using the projection device 100 to generate the test pattern, drawing designs of a test pattern on pieces of material is avoided, thus the time cost is saved, and the working efficiency is improved.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A projection device comprising:
a light emitting assembly, the light emitting assembly comprising a light emitter and a patterning plate on the light emitter, the light emitting being configured to emit light towards the patterning plate,
wherein the patterning plate comprises a first surface facing the light emitter and a second surface opposite to the first surface, the second surface is concave and defines a patterning groove, light from the light emitter passes through the patterning groove to form an original patterns;
the patterning plate defines a first area corresponding to the patterning groove and a second area, a material of the first area is transparent, a material of the second area is non-transparent.

2. The projection device of claim 1, wherein the light emitter is a monochromatic emitter.

3. The projection device of claim 1, wherein the light emitting assembly further comprises a base plate, the light emitter is arranged on the base plate.

4. The projection device of claim 3, wherein the patterning plate is detachably mounted on the base plate.

5. The projection device of claim 3, wherein the projection device further comprises a collimating element on the light emitting assembly and a support element for supporting the collimating element, the support element is arranged on a surface of the patterning plate away from the light emitter, the support element defines a first through hole, the patterning groove is exposed at the first through hole.

6. The projection device of claim 5, wherein the support element comprises a first support portion and a second support portion coupled to the first support portion, the first through hole extends through the first and the second support portions, the first support portion is arranged on the patterning plate, a width of the first support portion is less than a width of the second portion, a first step is defined between the first and the second support portions to support the collimating element.

7. The projection device of claim 5, wherein the projection device further comprises a diffractive optical element on the collimating element and a bracket supporting the diffractive optical element, the bracket is arranged on a surface of the support element away from the light emitter, the bracket defines a second through hole, an area of a surface of the bracket, away from the support element and adjacent to the second through hole is concave, the surface defines a second step, the second step is configured to support the collimating element.

8. A projection system comprising:
   a projection device, the projection device comprising:
      a light emitting assembly, the light emitting assembly comprising a light emitter and a patterning plate on the light emitter, the light emitting being configured to emit light towards the patterning plate; and
   an image screen spaced from the projection device;
   wherein the patterning plate comprises a first surface facing the light emitter and a second surface opposite to the first surface, the second surface is concave and defines a patterning groove, light from the light emitter passes through the patterning groove to form an original pattern, the projection device is configured to generate an actual pattern based on the original pattern and project the actual pattern onto the image screen, the actual pattern corresponds to the original pattern;
   the patterning plate defines a first area corresponding to the patterning groove and a second area, a material of the first area is transparent, a material of the second area is non-transparent.

9. The projection system of claim 8, wherein the image screen is a flat panel.

10. The projection system of claim 8, wherein the light emitter is a monochromatic emitter.

11. The projection system of claim 8, wherein the light emitting assembly further comprises a base plate, the light emitter is arranged on the base plate.

12. The projection system of claim 11, wherein the patterning plate is detachably mounted on the base plate.

13. The projection system of claim 11, wherein the projection device further comprises a collimating element on the light emitting assembly and a support element for supporting the collimating element, the support element is arranged on a surface of the patterning plate away from the light emitter, the support element defines a first through hole, the patterning groove is exposed at the first through hole.

14. The projection system of claim 13, wherein the support element comprises a first support portion and a second support portion coupled to the first support portion, the first through hole extends through the first and the second support portions, the first support portion is arranged on the patterning plate, a width of the first support portion is less than a width of the second portion, a first step is defined between the first and the second support portions to support the collimating element.

15. The projection system of claim 13, wherein the projection device further comprises a diffractive optical element on the collimating element and a bracket supporting the diffractive optical element, the bracket is arranged on a surface of the support element away from the light emitter, the bracket defines a second through hole, an area of a surface of the bracket, away from the support element and adjacent to the second through hole is concave, the surface defines a second step, the second step is configured to support the collimating element.

* * * * *